March 4, 1930.   H. E. NORVIEL   1,749,352
ELECTRIC SWITCH
Filed Oct. 31, 1927
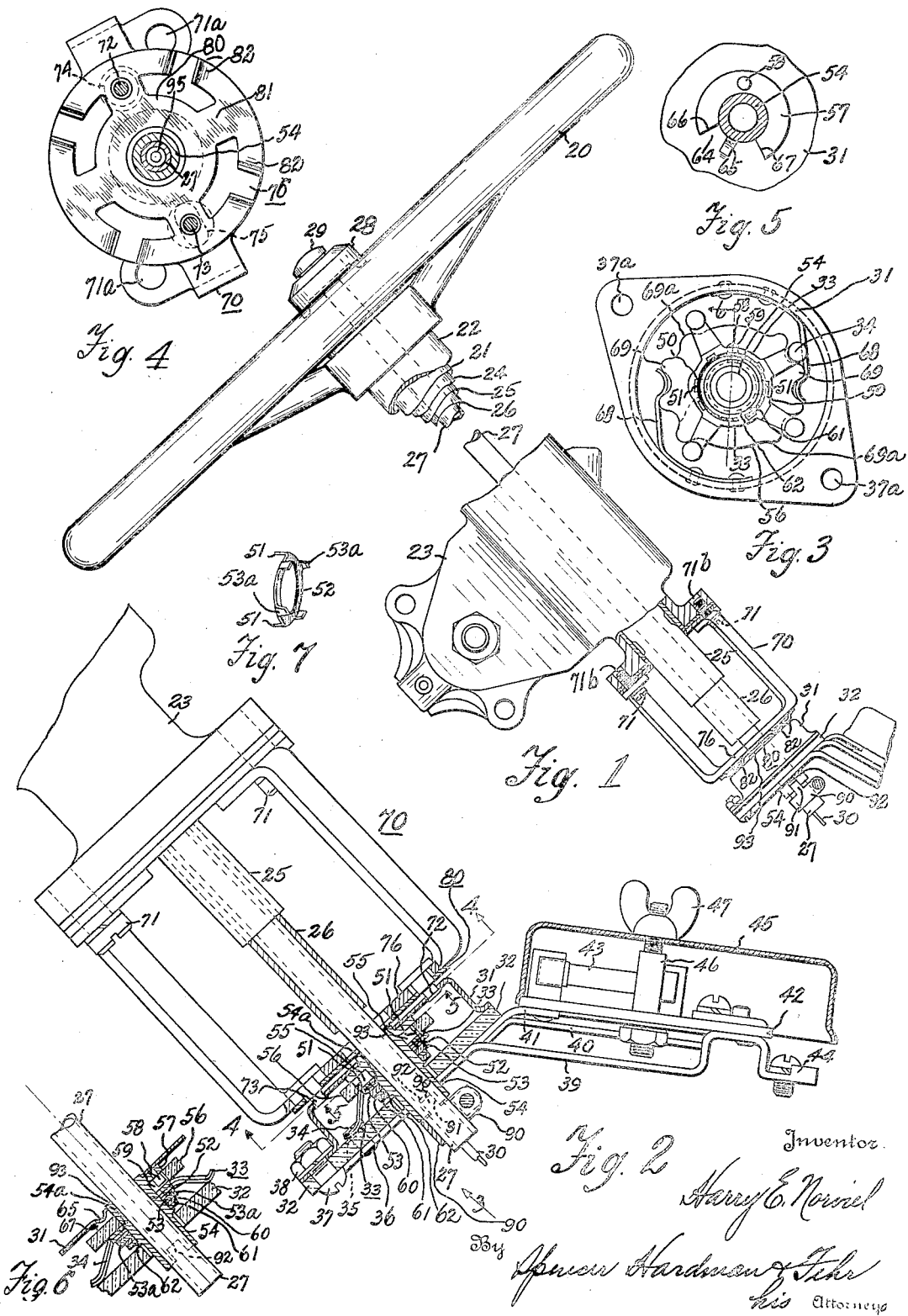
Inventor
Harry E. Norviel
By Spencer Hardman & Fehr
his Attorneys Patented Mar. 4, 1930

1,749,352

UNITED STATES PATENT OFFICE

HARRY E. NORVIEL, OF ANDERSON, INDIANA, ASSIGNOR TO DELCO-REMY CORPORATION, OF DAYTON, OHIO, A CORPORATION OF DELAWARE

ELECTRIC SWITCH

Application filed October 31, 1927. Serial No. 229,862.

This invention relates to electric switches which are adapted to be mounted upon the lower end of the steering column of an automobile and are adapted to cooperate with a rod extending through the steering column and terminating above the steering wheel in a rotatable knob or lever by which the electric switch is controlled from the driver's seat.

One object of the present invention is to provide means for attaching the case of the switch to the lower end of the steering column and for permitting the shaft of the switch which carries the movable switch contact to align itself automatically with the rod which extends through the steering column so that when the rod and switch shaft are drivingly connected, neither of these parts will be bent or otherwise forced out of normal position so as to interfere with the operation of the switch or make it difficult to operate.

Further objects and advantages of the present invention will be apparent from the following description, reference being had to the accompanying drawings, wherein a preferred form of embodiment of the present invention is clearly shown.

In the drawings:

Fig. 1 is a fragmentary view of a steering column of an automobile equipped with the switch embodying the present invention.

Fig. 2 is a fragmentary side view on a larger scale showing the lower end of the steering column and the bracket for attaching to the steering column the switch which is shown in cross section.

Fig. 3 is a view, looking in the direction of arrow 3 in Fig. 2, with the switch contact base removed.

Fig. 4 is a sectional view on the line 4—4 of Fig. 2.

Fig. 5 is a sectional view on the line 5—5 of Fig. 2.

Fig. 6 is a sectional view on the line 6—6 of Fig. 3.

Fig. 7 is a perspective view of a driving and locating washer.

The steering wheel 20 is attached to a steering wheel shaft 21 which is supported by a steering wheel mast 22 and a steering gear housing 23 and which operates a steering gear in the usual manner contained within the housing 23.

The shaft 21 encloses a number of concentric tubes 24, 25, 26, and 27, the first one of these being stationary and supporting above the hub of the steering wheel a stationary bracket not shown. As well known to those skilled in this art, this stationary bracket supports levers for controlling the engine throttle and the engine ignition apparatus and may be connected to the tubes 25 and 26, respectively. The tube 27 is connected at its upper end with a lever or knob 28 which supports a horn button 29 connected with a horn circuit by a wire 30 which extends through the tube 27 and emerges from the bottom of the tube whence it may lead to a terminal of an electric horn.

The electric switch which is operated by the knob 28 and shaft 27 comprises a cup-shaped metal case 31 adapted to receive a non-conducting cover or switch 32 in order to provide an enclosure for a movable contact member 33 having contact fingers 34 for engaging suitable stationary contacts 35 provided by rivets 36 secured to the base 32. The base 32 is secured to the case 31 by a plurality of bolts and nuts, a bolt being shown at 37 and a nut at 38. The flange of the case 31 has holes 37ª for receiving the bolts 37. The rivets 36 secure to the base 32 a number of metal supports 39, 40 and 41 which are attached to a non-conducting fuse and terminal block 42. The members 39, 40 and 41 are conductors for electrically connecting the various stationary contacts of the switch with fuses and terminal clips, one of the fuses being shown at 43 and a terminal at 44. The fuses 43 are protected by a cover 45 which is attached to the fuse block 42 by a stud 46 and a wing nut 47.

The movable contact 33 is provided with oblong apertures 50 each for receiving a tang 51 provided by metal washer 52 which is supported centrally by a non-conducting washer 53 mounted snugly upon a switch shaft 54. Washer 53 is embraced by tangs 53ª of the washer 52 (see Fig. 6) in order to locate the washer 52 centrally of the washer 53, and hence to locate the switch contact 33 centrally of the shaft 54, without requiring an insulating sleeve. As shown there is a space 54ᵃ between the shaft 54 and the contact 33. The tangs 51 are received by notches 55 in a nonconducting ratchet plate 56 which is drivingly connected with a flange 57 of the shaft 54 by providing the flange with a stud 58 which is received by a notch 59 in the plate 56. The ratchet plate 56, the contact 33 which is composed of two superposed punchings as shown in Fig. 2, the connecting washer 52, the insulating washer 53 and two metal washers 60 and 61 are all clamped between the flange 57 and a small flange 62 which is formed by staking after the parts mentioned have been assembled upon the shaft 54.

The flange 57 of the shaft 54 is provided with a notch 64 for receiving a lug 65 provided by the back of the switch case 31. The surfaces 66 and 67 defining the notch 64 cooperate with the lug 65 in order to limit rotation of the shaft 54. The shaft 54 is indexed in its various circuit making or breaking positions by a plurality of leaf springs 68 each adapted to cooperate with a series of teeth 69 provided by the detent plate 56. Certain of these teeth, for example teeth 69ᵃ, may be shorter than others in order to provide for more easy movement from one position to another. This is useful in providing for easy movement between dim and bright positions when the switch is used to control a lighting circuit.

A U-shaped bracket 70 which is attached by screws 71 to the steering gear case 23 supports the switch case 31 in a manner which will now be described. The case 31 is attached to rivets 72 and 73 which are axially slidable thru the back wall of the case and which pass through hole 74 and slots 75, respectively, in the yoke or transverse member 76 of the bracket 70. The hole 74 is substantially larger than the shank of the rivet 72 so as to permit an orbital movement of the rivet 72 with relation to the bracket. The slot 75 is but slightly greater in width than the diameter of the shank 73 in order to prevent substantial rotation of the rivet 73 relative to the axis of the tube 27 while permitting the rivet to move freely in a radial direction. The space between the back of the switch case and the bottom surface of the transverse member 76 of the bracket 70 is occupied by a washer 80 having a plurality of arms 81 each carrying two resilient fingers 82 which are shaped in such manner as to urge the switch case away from the bracket so that the heads of the rivets 72 and 73 bear against the transverse member 76 with yielding pressure.

After the switch case 31 containing the switch shaft 54 and elements supported thereby has been assembled with the bracket 70 by the rivets 72 and 73 and the plate 80, the structure is assembled with the steering gear case 23 by first passing the switch shaft 54 over the tube 27 and then securing the bracket 70 by the screws 71. The shaft 27 is drivingly connected with the shaft 54 by a clamp 90 having lugs 91 which are received by notches 92 provided by the shaft 54. The mounting of the switch shaft 54 upon the tube 27 fixes the relation of the shaft 54 and the parts carried thereby to the tube 27. Since the shaft 54 has a cylindrical portion 93 coaxial and having a running fit with an orifice provided in the back wall of the case 31, the case 31 is fixed in its relation to the tube 27 so that it can not move radially relative to the tube. The connections of the case 31 to the bracket 70 by the studs 72 and 73 prevent rotation of the case 31 when the contact fingers 34 are rotated in frictional engagement with the switch base 32; but these connections permit an orbital movement of the switch case 31 relative to the bracket 70 in case the tube 27 does not rotate concentrically with its own axis. It is apparent that if the tube rotates eccentrically so that its own axis moves in an orbit defined by the small circle 95 in Fig. 4, a similar movement of the case 31 will take place. This movement is permitted since the slot 75 will permit of straight line oscillatory movement of the case 31 as well as a swinging movement, the case pivoting about the stud 73 while the stud 72 may move in a curved path. The hole 74 provides clearance for this movement of the stud 72.

The rod 27 may even rotate about an axis which is slightly oblique as well as eccentric to its own axis, thereby causing the shaft 54 and the case 31 to wobble while making an orbital movement in the manner described before. This wobbling movement is permitted since the case 31 is not closely confined to the transverse member 76 but is held in spaced relation thereto by the spring fingers 82 which will yield to permit a slight wobbling movement to the case 31 to the transverse member 76.

It is therefore apparent that the present invention provides a switch construction and mounting therefor adapted to be attached to the lower end of the steering column and to a control tube extending through the column, and that the construction is such that the switch may be operated without difficulty although the operating rod does not rotate exactly about its own axis. The construction is such that extreme care in the manufacture of the switch case and mounting bracket is not required. A slight variation in the location of the holes in the mounting bracket which receives the screws 71 is permitted. After the switch has been attached to the tube 27, the bracket 70 may be moved slightly relative to the switch case in order to align the holes 71ᵃ with threaded holes 71ᵇ provided in the gear case 23 for receiving the screws 71.

While the form of embodiment of the present invention as herein disclosed, constitutes a preferred form, it is to be understood that other forms might be adopted, all coming within the scope of the claims which follow.

What is claimed is as follows:

1. An electric switch adapted to be mounted at the lower end of a steering column and having an operating shaft adapted to be drivingly connected with a rod extending through the steering column, and having a case enclosing the operating shaft, and means for attaching the case to a steering column and adapted to permit oscillation of the case relative to the steering column as the shaft is turned by said rod.

2. An electric switch according to claim 1 in which the case is permitted to move with an orbital motion relative to the steering column.

3. An electric switch according to claim 1 in which the case is permitted to wobble relative to the steering column.

4. An electric switch according to claim 1 in which the case is permitted to move with orbital, wobbling motion relative to the steering column.

5. An electric switch comprising in combination an operating shaft, a movable switch contact having a hub provided with an aperture through which the shaft extends, said aperture being substantially larger in diameter than that portion of the shaft which the hub surrounds, two non-conducting plates between which the contact hub is clamped, means for drivingly connecting one of the plates with the shaft, means for drivingly connecting the contact with one of the plates, means cooperating with the contact and one of the plates for fixing the relation of the contact hub to the shaft, there being a vacant space between the hub and shaft, and a case enclosing the shaft and carrying stationary contacts which the movable contact engages.

6. An electric switch comprising in combination, an operating shaft having a flange, a detent plate of non-conducting material positioned against said flange, means for drivingly connecting the flange and detent plate, a movable contact having a hub positioned against said detent plate, the hub having an aperture through which the shaft extends and larger in diameter than that portion of the shaft which the hub surrounds, a washer positioned against said contact hub and having tangs which are received by apertures in the hub and notches in the detent plate for the purpose of drivingly connecting the detent plate and movable contact, said washer having other tangs projecting away from the contact hub, a non-conducting washer surrounding and closely fitting the shaft and cooperating with the last mentioned tangs to maintain the contact hub in fixed, spaced relation to the shaft, means cooperating with the shaft for clamping the detent plate, the contact, and the two washers against the flange of the shaft, resilient means cooperating with the detent plate for yieldingly maintaining the shaft in various positions, and a case enclosing the shaft and carrying stationary contacts which the movable contact engages.

7. In an electric switch adapted to be mounted at the lower end of a steering column and having an operating shaft drivingly connected with a rod extending through the steering column, the combination of, a case enclosing the operating shaft, a bracket attached to the steering column and oscillatably supporting said case relative to the steering column as the shaft is turned by said rod.

8. In an electric switch adapted to be mounted at the lower end of a steering column and having an operating shaft drivingly connected with a rod extending through the steering column, the combination of, a case enclosing the operating shaft, a bracket supporting said case so as to be orbitally movable relative to the steering column.

9. In an electric switch adapted to be mounted at the lower end of a steering column and having an operating shaft drivingly connected with a rod extending through the steering column, the combination of, a case enclosing the operating shaft, a bracket loosely supporting said case so as to be capable of wobbling relative to the steering column.

10. In an electric switch adapted to be mounted at the lower end of a steering column and having an operating shaft drivingly connected with a rod extending through the steering column, the combination of, a case enclosing the operating shaft, a bracket loosely supporting said case so as to be orbitally movable, and capable of wobbling relative to the steering column.

11. In an electric switch, adapted to be mounted at the end of a steering column or the like and having an operating shaft drivingly connected with a rod extending through the said column, the combination of, means for automatically aligning the operating shaft with the control member, comprising, a case enclosing said shaft and a bracket fixed to said column and loosely supporting said case.

12. In an electric switch, adapted to be mounted at the end of a steering column or the like and having an operating shaft drivingly connected with a rod extending through the said column, the combination of, means for automatically aligning the operating shaft with the control member, comprising, a U-shaped bracket fixed to said column, provided with stud-receiving apertures in the yoke portion thereof of a case enclosing the said driving connection and studs fixed to the case, and received by the relatively large apertures in the yoke, so as to allow orbital movement and wobbling of the case relative to the column.

In testimony whereof I hereto affix my signature.

HARRY E. NORVIEL.